United States Patent
Gregorian et al.

(10) Patent No.: US 6,452,425 B1
(45) Date of Patent: Sep. 17, 2002

(54) AUTOMATIC FREQUENCY RATE SWITCH

(75) Inventors: Roubik Gregorian, Saratoga; Manop Thamsirianunt, Fremont, both of CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 09/782,789

(22) Filed: Feb. 13, 2001

(51) Int. Cl.$^7$ ................................................ H03K 17/00
(52) U.S. Cl. ......................... 327/99; 370/446; 370/467
(58) Field of Search ............................. 327/99, 47, 48, 327/49; 370/465, 518, 467, 480, 310.1, 395.5, 395.52, 466, 469

(56) References Cited

U.S. PATENT DOCUMENTS

| | | | |
|---|---|---|---|
| 4,441,061 A | * | 4/1984 | Yoshida et al. ............. 318/329 |
| 5,777,520 A | * | 7/1998 | Kawakami .................. 331/1 R |
| 5,978,487 A | * | 11/1999 | Kusaba ........................ 381/56 |
| 6,005,634 A | * | 12/1999 | Lam et al. .................. 348/541 |

* cited by examiner

Primary Examiner—Tuan T. Lam
Assistant Examiner—Hiep Nguyen
(74) Attorney, Agent, or Firm—Townsend and Townsend and Crew LLP

(57) ABSTRACT

A method and apparatus for automatically determining the protocol being used from the frequency of an applied clock without the need for a separate pin or switch or a second external clock. The clock's frequency is identified when its frequency falls into the set range for which the apparatus is targeted. Based on the detected frequency in the set range, a mode select signal is generated. The mode select signal causes the chip to configure to the appropriate frequency for that mode, as well as any other unique configuration parameters. In one embodiment, the invention generates a ramp signal triggered by the external clock (which is the clock frequency for the desired protocol). The clock is simultaneously applied to a counter. When the ramp signal reaches a reference voltage, the count of the counter is compared to at least one threshold to determine to which frequency it corresponds. In response to this determination, the chip is configured according to the communication mode or protocol indicated. This may be simply the appropriate frequency, but, depending upon the chip, may include pulse shaping, framing and other configuration selections.

17 Claims, 9 Drawing Sheets

AUTOMATIC FREQUENCY RATE SWITCH

BACKGROUND OF THE INVENTION

The present invention relates to semiconductor chips used in telecommunications, and in particular to mechanisms for switching between different frequency rates for different transmission protocols.

A variety of different semiconductor chips are used for specialized telecommunications applications. Examples of such chips include line transmitters, line receivers, framer ICs, etc. Such devices often are designed to support more than one communications protocol. For example, they may support both E1 and T1, or may support E3, STS-1, DS3, etc. When a customer buys such a chip and places it in a particular application, the protocol for which it is being used must be selected. That protocol typically corresponds to a different frequency rate.

Depending on which protocol is selected, a number of internal functions are performed differently. The most basic is that the frequency of transmission, or bit rate, will vary from one protocol to another. Another difference is that the protocol will specify parameters for the pulse shape of the bits, which will require different approaches on shaping the pulse for transmission or detecting it upon reception. In addition, the framing of the bits can vary as well.

A couple of different methods are used for indicating which protocol, or frequency rate, is to be used. One is simply to have a toggle switch or a separate control input pin which indicates which protocol. In an alternate approach, the chip can figure out the protocol from the frequency of the clock applied to the chip in connection with the data. This is accomplished by including a second clock input which can be used to compare against the protocol clock to determine its frequency and thus identify its protocol.

The method of comparing two frequency sources using a digital frequency discriminator is well know. However, this method requires not only an additional accurate clock source, the second clock source adds clock noise to the system. It is impossible to utilize this approach if the application cannot afford or does not have the additional independent clock source.

SUMMARY OF THE INVENTION

The present invention provides a method and apparatus for automatically determining the protocol being used from the frequency of an applied clock without the need for a separate pin or switch or a second external clock. The clock's frequency is identified when its frequency falls into the set range for which the apparatus is targeted. Based on the detected frequency in the set range, a mode select signal is generated. The mode select signal causes the chip to configure to the appropriate frequency for that mode, as well as any other unique configuration parameters.

In one embodiment, the invention generates a ramp signal triggered by the external clock (which is the clock frequency for the desired protocol). The clock is simultaneously applied to a counter. When the ramp signal reaches a reference voltage, the count of the counter is compared to at least one threshold to determine to which frequency it corresponds. In response to this determination, the chip is configured according to the communication mode or protocol indicated. This may be simply the appropriate frequency, but, depending upon the chip, may include pulse shaping, framing and other configuration selections.

In one embodiment, the ramp signal is generated using a fixed current source which charges up a capacitor. Two switches are connected in parallel with the capacitor for discharging the capacitor, one switch being a smaller current device than the other switch. The purpose of the two switches is to allow staggered turn on and turn off of the ramp to avoid voltage spikes which could cause an inaccurate start of the ramp signal.

In one embodiment, the fixed current source is connected to an off-chip resistor. This resistor, in combination with the internal trimmable bandgap reference generator, ensures stable and accurate ramp timing over variations in temperature and power supply operation. During manufacture of the chip, a known clock frequency can be applied and the time for the ramp to reach the reference voltage can be determined. If the time is off, the bandgap reference voltage is trimmed accordingly to adjust the current source and thus the targeted count in order to compensate for process variations.

For a further understanding of the nature and advantages of the invention, reference should be made to the following description taken in conjunction with the accompanying drawings.

DESCRIPTION OF THE SPECIFIC EMBODIMENTS

Figure 1:
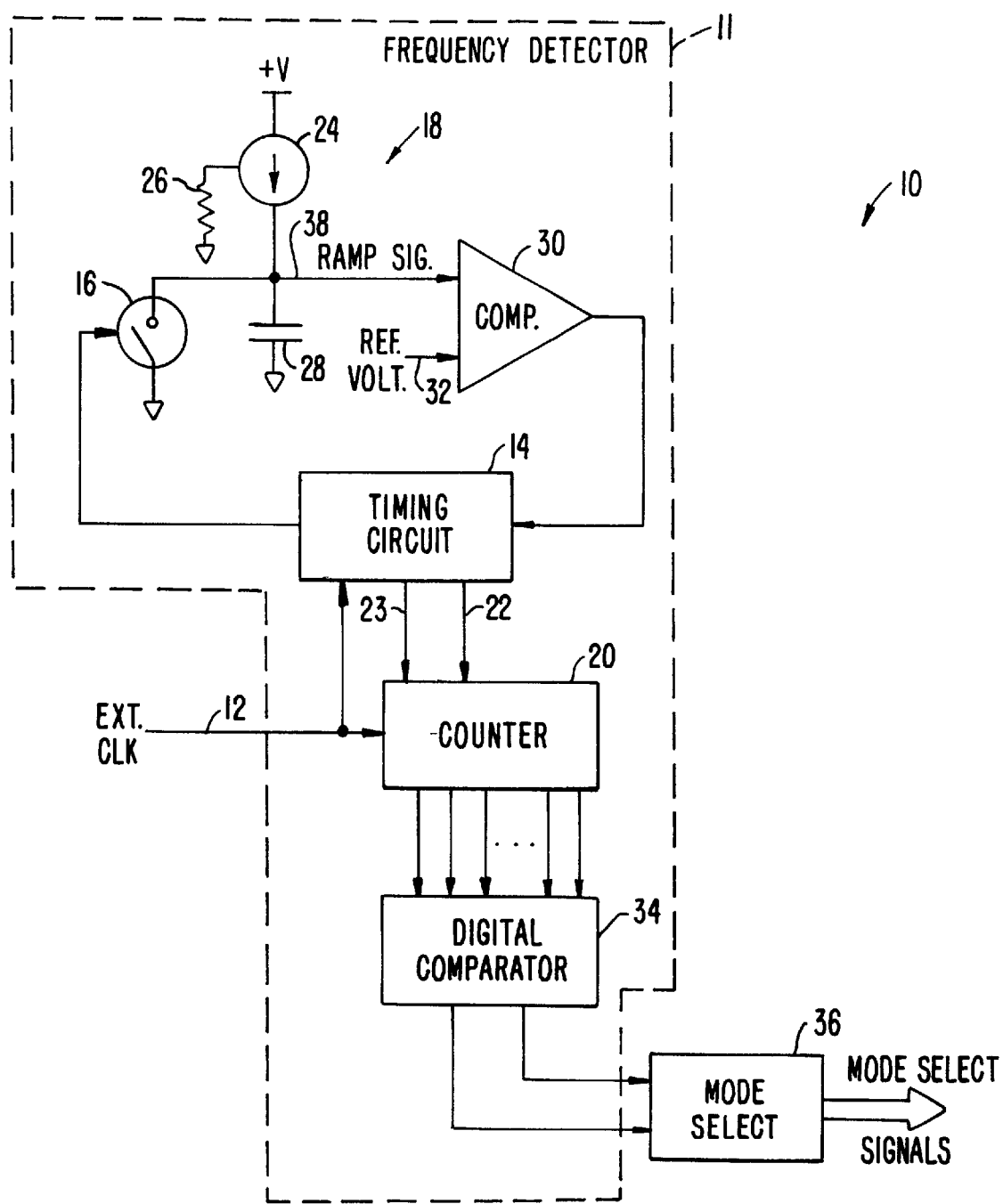
FIG. 1 is a block diagram of an embodiment of the invention.

FIG. 1 is a block diagram of an automatic frequency rate switch 10 according to one embodiment of the invention with a frequency detector 11 and a mode select circuit 36. A system clock is provided on an input pin 12. By determining the frequency of this clock, the invention determines the protocol being used. Clock input 12 is applied to a timing circuit 14. Timing circuit 14 will activate a switch 16 to start ramp generator circuit 18. At the same time, counter 20 will be enabled by line 22 from timing circuit 14 to start counting the clocks on gated system clock line 23.

Ramp generator circuit 18 includes a fixed precision current source 24 with a resistance 26. The resistor is the only component off chip and can be chosen to have good accuracy and temperature stability such as 1%, 100 ppm metal film or metal oxide resistor. The resistor together with the internally trimmed precision voltage source (such as bandgap reference circuit) generates a precise predetermined current 24. This current charges up a capacitor 28 as the ramp voltage builds up. The voltage on the capacitor is applied on a line 38 as a ramp signal to one input of a comparator 30. The other input of comparator 30 on a line 32 is a reference voltage.

When the ramp voltage is equal or exceeds the reference voltage, comparator 30 will provide an output to timing circuit 14, which will then provide a signal to counter 20 to cause its count to stop counting and be output to a digital comparator 34. The output of the digital comparator will go to mode selection circuitry 36 to determine in which range the clock frequency falls, and to appropriately configure the semiconductor chip with mode select output signals.

Figure 2:
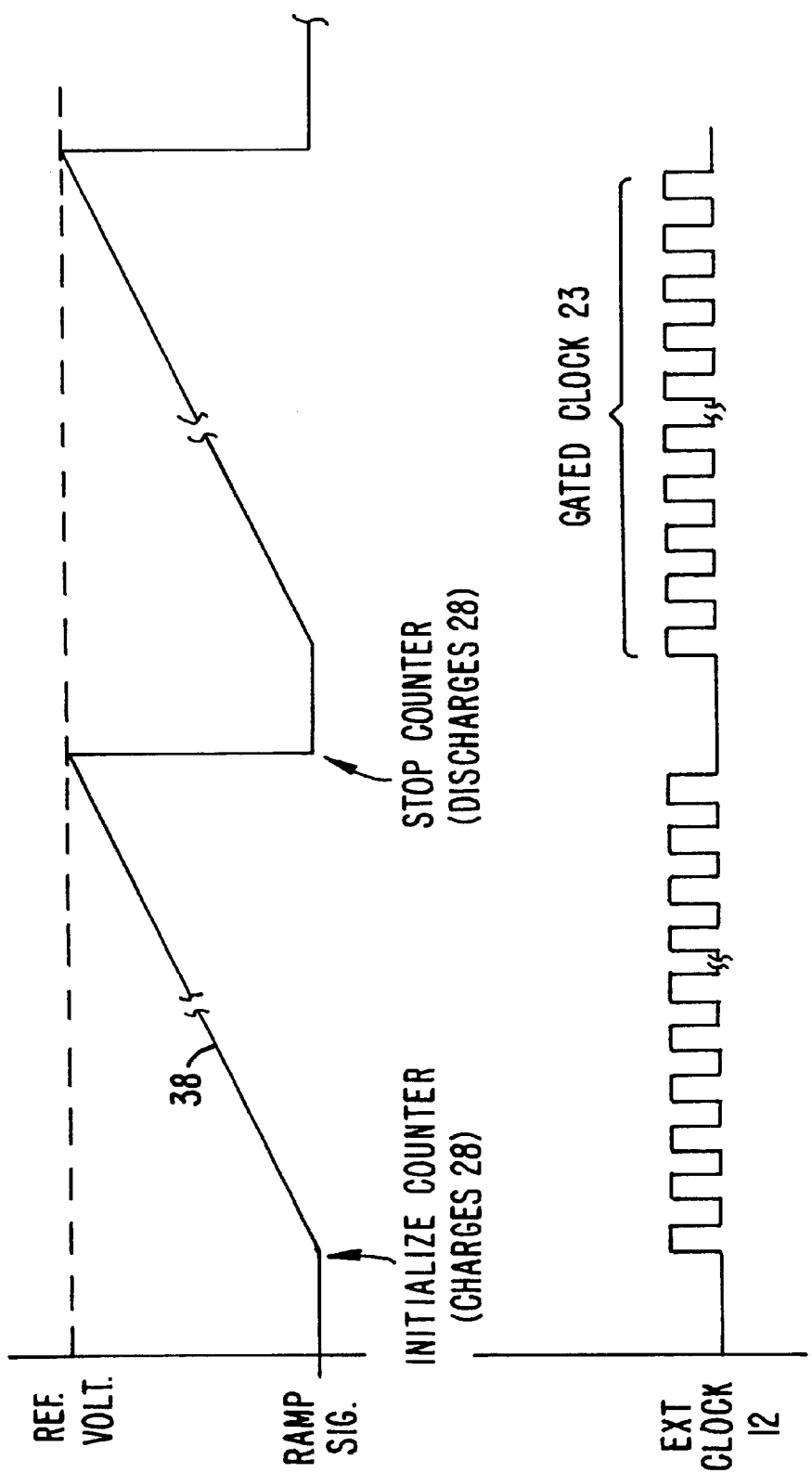
FIG. 2 is a timing diagram illustrating the ramp and clock signals of FIG. 1.

FIG. 2 illustrates the ramp signal input to comparator 30 as a signal 38. As can be seen, while signal 38 is ramping to reference voltage 32, system clock 12 is gated by ramping time 38, providing pulse stream 23 which can be counted by counter 20. Obviously, for a higher frequency, more pulses will be counted during the ramp time by counter 20. For a lower frequency, fewer pulses will be counted.

Figure 3:
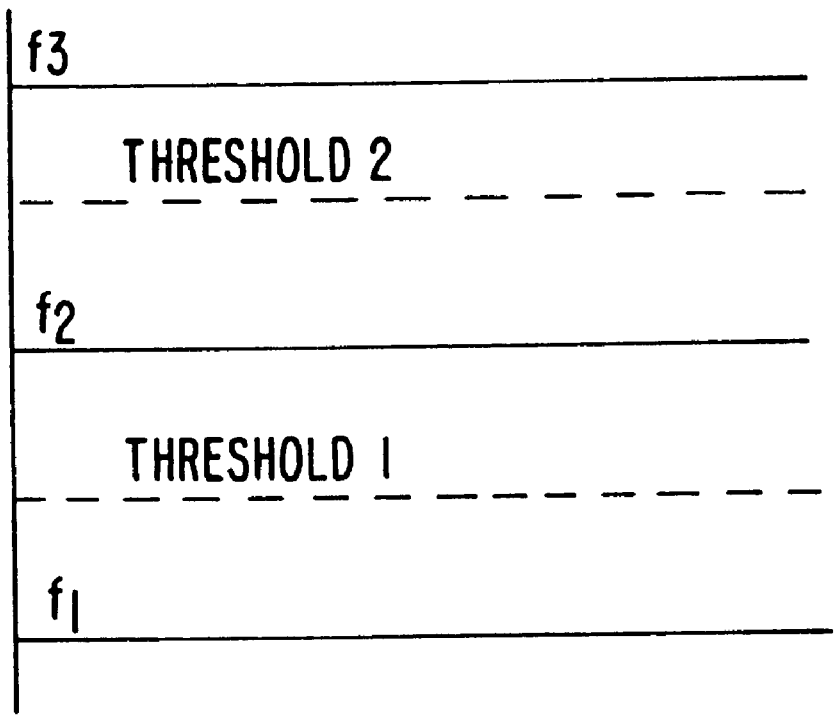
FIG. 3 is a diagram illustrating multiple thresholds for selecting between three frequencies.

FIG. 3 illustrates an example of where three possible frequencies F1, F2, and F3 are supported by the chip. The count of counter 20 is compared to two thresholds, threshold 1 and threshold 2. If the count is less than threshold 1 and 2, the system clock is determined to be frequency F1. If the count is greater than threshold 2 and 1, the system clock is determined to be frequency F3. If the count falls between threshold 1 and threshold 2, the system clock must be frequency F2.

In other embodiments, the invention can be applied to more than three frequencies by adding additional thresholds. Alternately, a single threshold allows the comparison between two different supported frequency rates.

Figure 4:
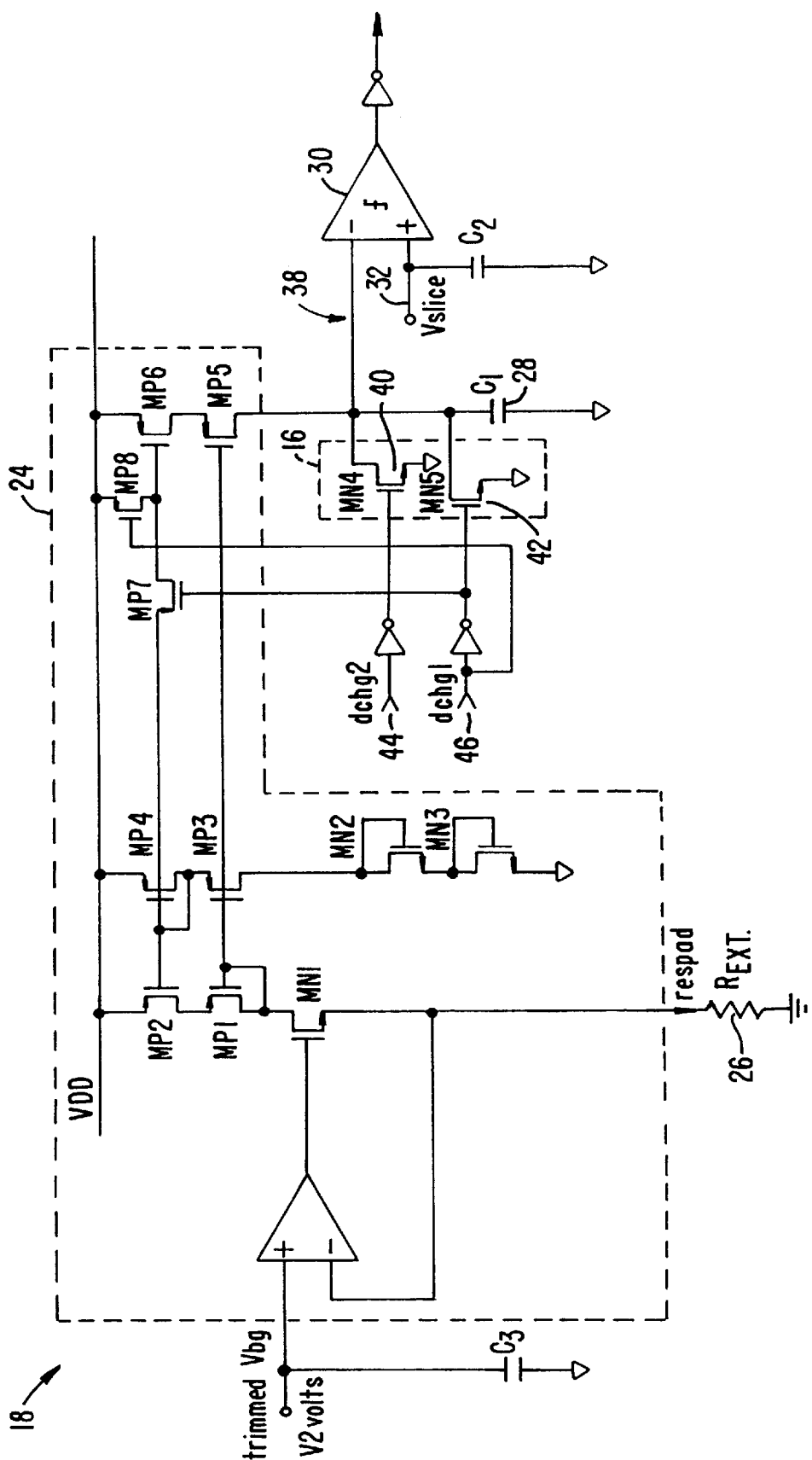
FIG. 4 is a schematic circuit diagram of the ramp generator of FIG. 1.

FIG. 4 is a schematic diagram of precision ramp generator 18 of FIG. 1. Current source 24 is delineated by the dotted lines. Resistor 26 is shown as an external precision resistor connected to "respad" as a chip's pin. Because of the importance of having the current constant to provide the same rate of charging or ramping time from wafer to wafer, the resistor, such as 1% tolerance off chip resistor, may be necessary. The external resistor helps reduce trimmable tasks, improves manufacturing yield, and minimizes circuit complexity. In one embodiment, the current source 24 can be included on the chip using a trimmable bandgap current. This approach eliminates the pins at the expense of circuit complexity and trimming task. In FIG. 4, v2volts is derived from an internal stable reference voltage circuit such as a bandgap voltage source. This reference can be trimmed precisely on chip. The v2volts with a fixed resistance 26 defines the amount of current 24 and will not change over temperature and process after trimming. The voltage reference "vslice" for comparator 30 is also derived by the same bandgap and trimmed together with the v2volts. This method guarantees the tracking between v2volts and vslice over temperature and wafer process related variations. The determination of the amount of current is done by applying a known frequency clock signal and measuring the count provided after the ramp signal reaches the reference voltage. Normally, if the external resistor is used and the resistance is chosen, if the count is not correct, the voltage "v2volts" is trimmed appropriately.

As shown in FIG. 4, switch 16 is actually formed with two switches 40 and 42. The two switches are turned on by two separate signals on lines 44 and 46 from timing circuit 14. The switches are made of transistors of different sizes, and allow for the stepped turn-on and turn-off of the current source in order to avoid large current or voltage spikes.

As shown in FIG. 4, capacitor 28 actually consists of a number of parallel capacitors. The total capacitance defines the ramp time. During the production trim, the variation of capacitance is, hence, substantially eliminated. These are connected, as shown, to the ramp signal input 38 of comparator 30.

Figures 5, 5A:
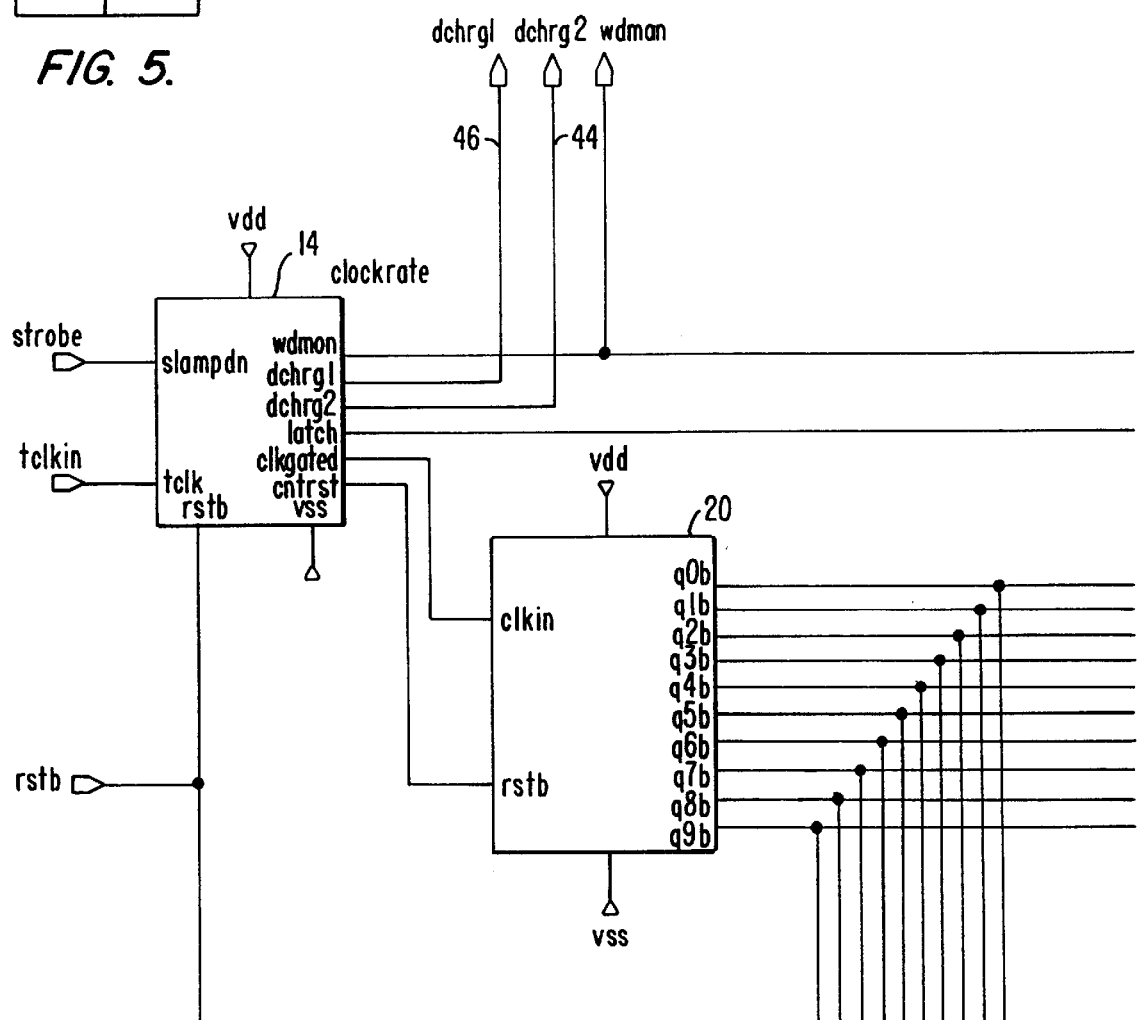
FIG. 5 is a schematic diagram of a digital auto sensing circuit corresponding to the digital comparator and mode selecting circuitry of FIG. 1.
Figure 5B:
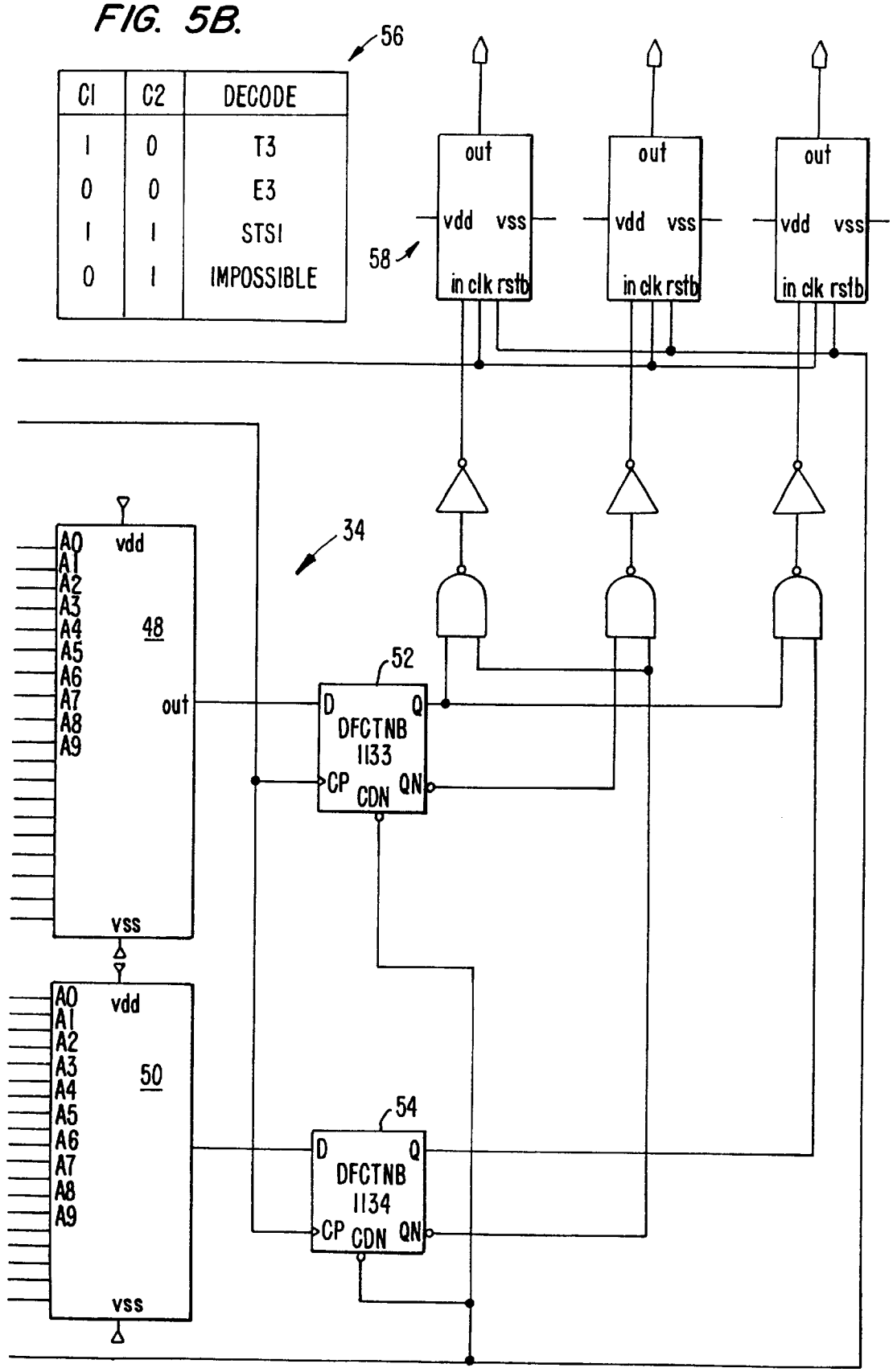

FIG. 5 is a schematic diagram of the portions of FIG. 1 which do digital auto sensing. In particular, counter 20 is shown in more detail as well as digital comparator 34, which is comprised of two digital comparators 48 and 50. Also shown in FIG. 5 are two latches 52 and 54 to avoid any glitches in the output signal. The output signal from the two latches, labeled C1 and C2, are two bits of digital code indicating one of three different protocols, as indicated in a table 56 in FIG. 5. The two codes indicate that the protocol is either T3, E3, or STS1.

The output codes C1 and C2 are processed through a digital filter 58. The digital filter is a long-time counter to be certain that there are no glitches. In one embodiment, the ramp is applied multiple times, and the average value of the comparison is used. FIG. 5 also shows the timing circuit or timing generator 14 with its switch control output lines 46 and 44.

Figure 6A:
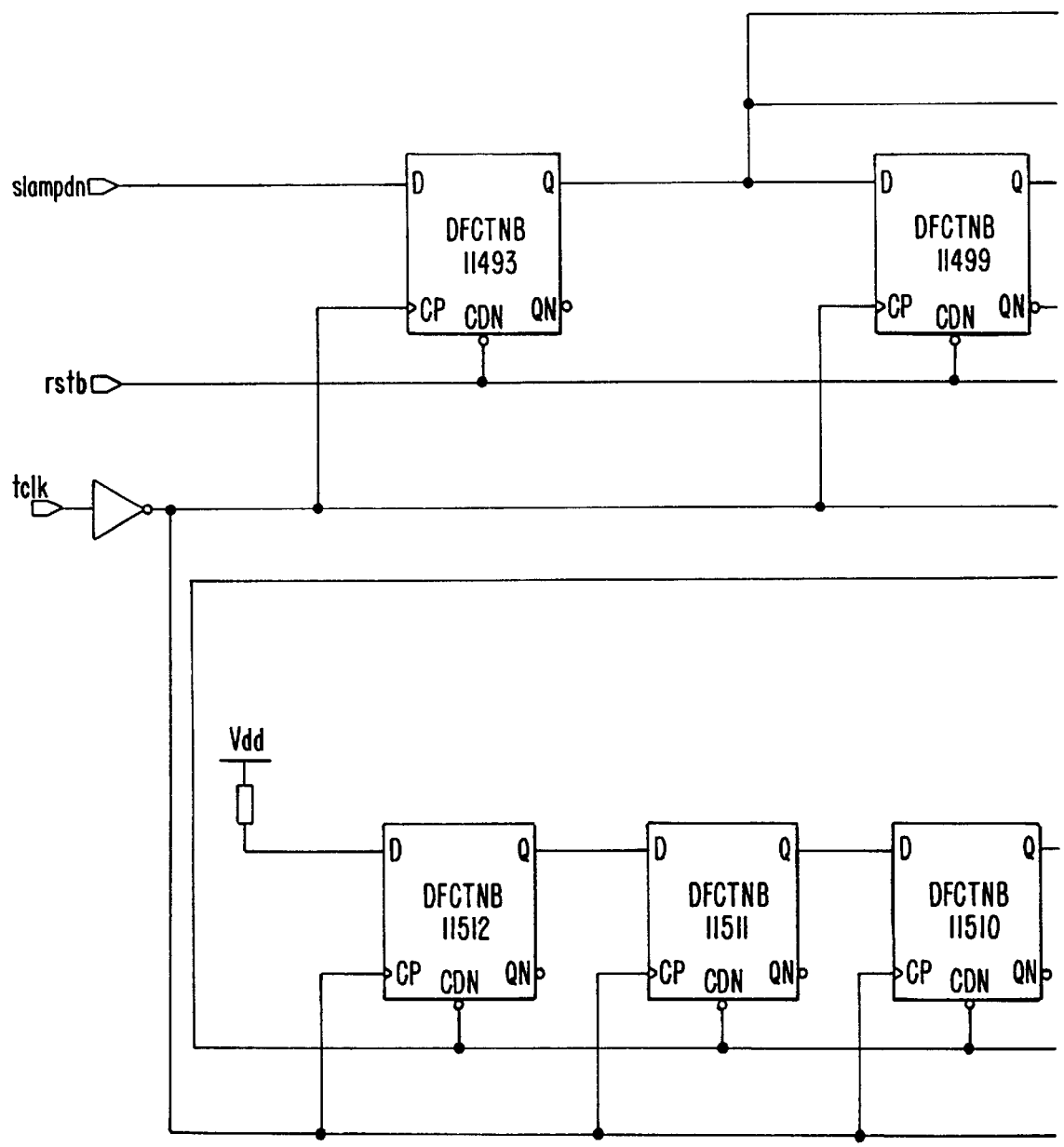
FIG. 6 is a schematic diagram of the timing circuit of FIG. 1.
Figure 6:
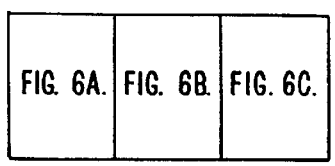
Figure 6B:
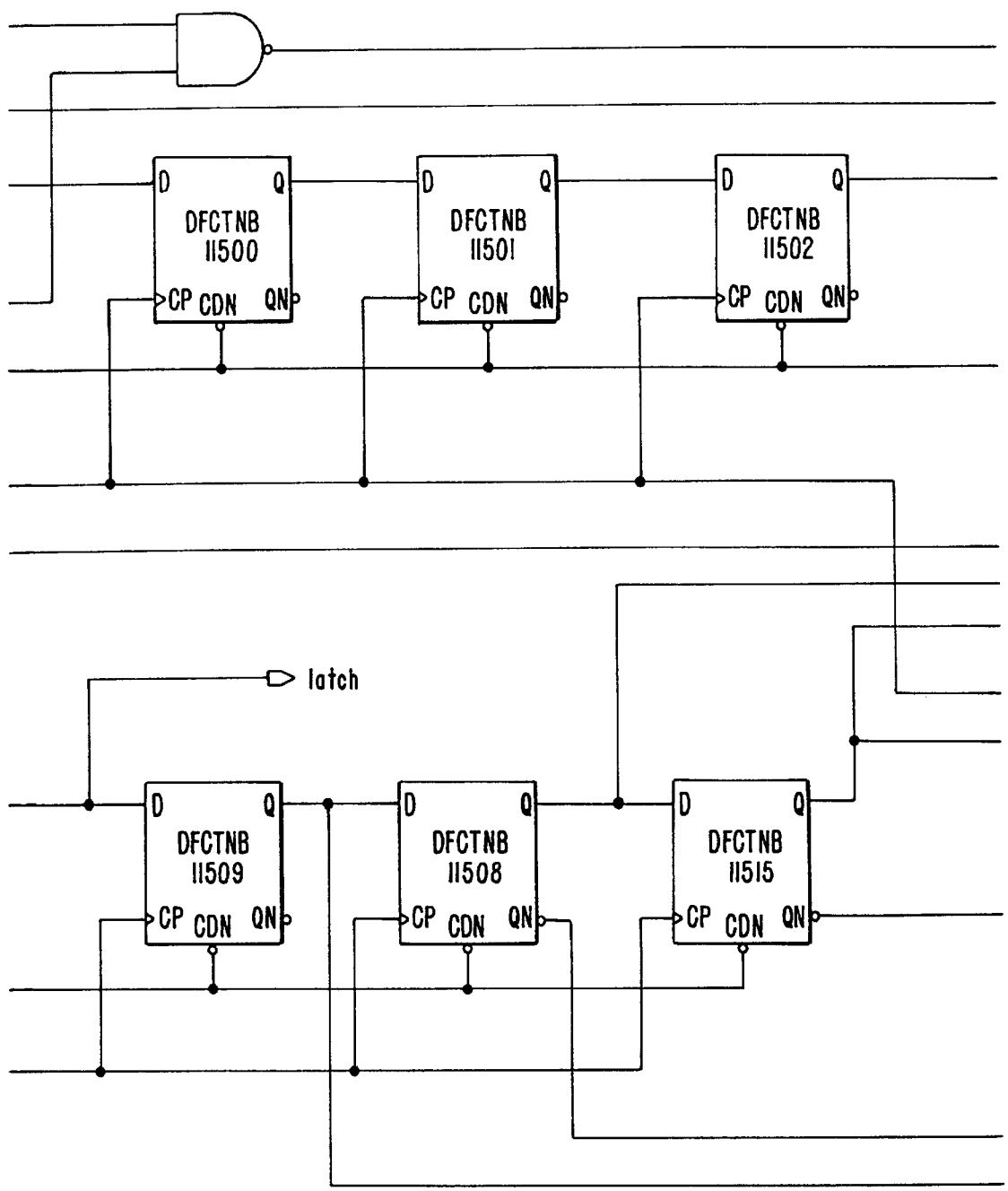
Figure 6C:
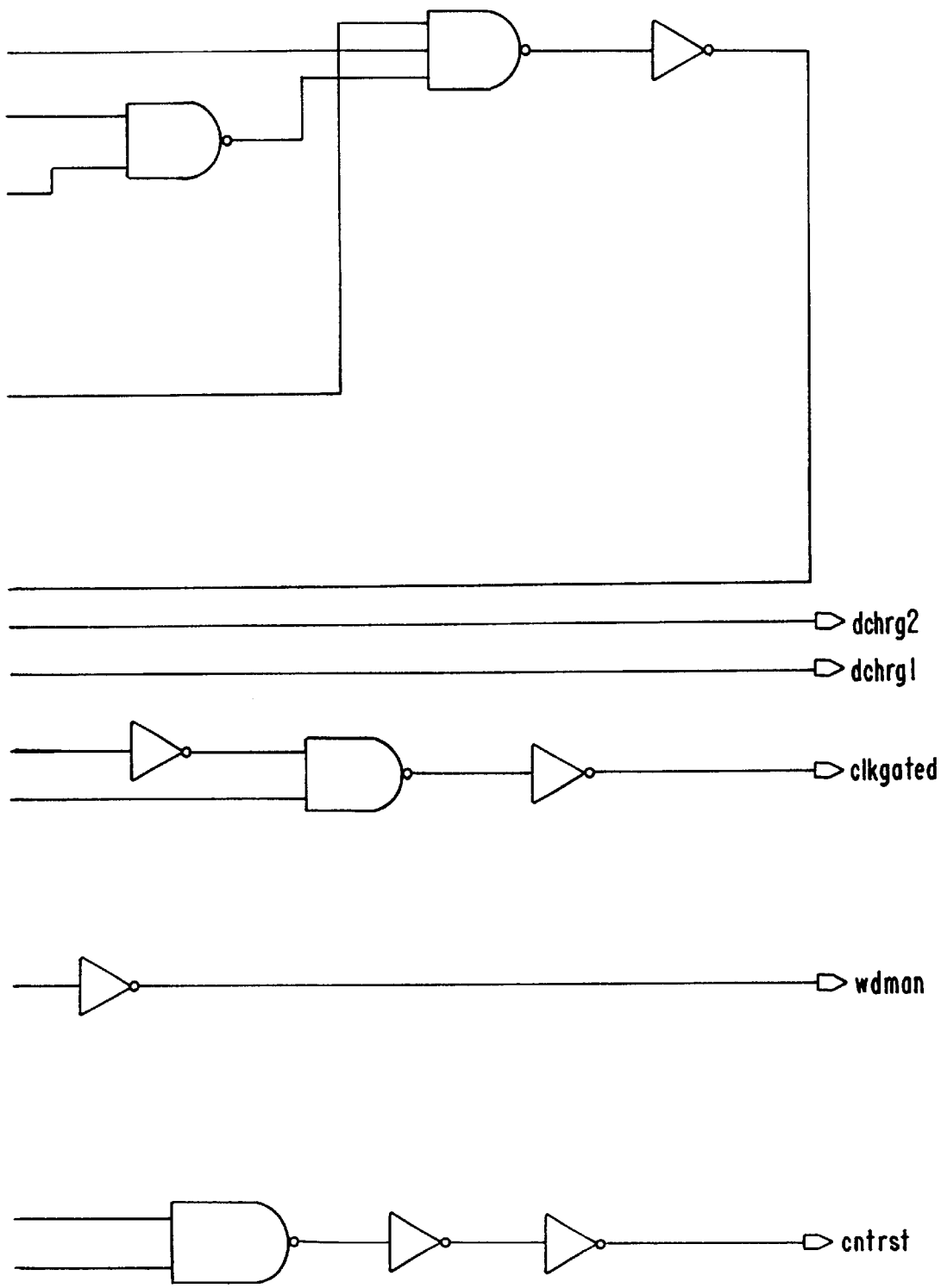

FIG. 6 is a schematic diagram of one embodiment of timing circuit 14 of FIGS. 1 and 5.

As will be understood by those of skill in the art, the present invention can be embodied in other specific forms without departing from the essential characteristics thereof. Accordingly, the foregoing description is intended to be illustrative, but not limiting, of the scope of the invention which is set forth in the following claims.

What is claimed is:

1. An automatic mode selector in a semiconductor chip, comprising:
   a clock input providing a system clock of a particular protocol;
   a frequency detector for determining a frequency of said system clock, without requiring an additional clock, and providing a detected frequency signal; and
   a mode selection circuit, coupled to said frequency detector and responsive to said detected frequency signal, for selecting a mode corresponding to said particular protocol.

2. The automatic mode selector of claim 1 wherein said protocol is one of STS-1, T3 and E3.

3. The selector of claim 1 wherein said frequency detector comprises:
   a ramp signal generator;
   a comparator for comparing an output of said ramp signal generator to a reference voltage;
   a timing circuit for enabling said ramp signal generator in response to said system clock;
   a counter coupled to said clock input, said counter being initialized by said timing circuit; and
   a comparison circuit for comparing an output of said counter to a threshold.

4. The selector of claim 3 wherein said ramp signal generator further comprises:
   a fixed current source;
   a capacitor coupled to said current source; and
   a first switch connected in parallel with said capacitor.

5. An automatic frequency rate selector in a telecommunications semiconductor chip, comprising:
   a ramp signal generator;
   a comparator for comparing an output of said ramp signal generator to a reference voltage;
   a clock input;
   a timing circuit for enabling said ramp signal generator in response to a clock signal from said clock input;
   a counter coupled to said clock input, said counter being initialized by said timing circuit; and
   a comparison circuit for comparing an output of said counter to at least one threshold.

6. The selector of claim 5 further comprising:
a mode selector, coupled to an output of said comparison circuit, for selecting a communication mode.

7. The selector of claim 5 wherein said comparison circuit is a digital comparator.

8. The selector of claim 5 wherein said ramp signal generator further comprises:
a fixed current source;
a capacitor coupled to said current source; and
a first switch connected in parallel with said capacitor.

9. The selector of claim 8 further comprising:
a second switch having a smaller current capacity than said first switch, said second switch being connected in parallel with said capacitor; and
said timing circuit sequentially activating said first and second switches to minimize voltage spikes.

10. The selector of claim 8 further comprising:
an external resistor coupled to said fixed current source.

11. The selector of claim 5 further comprising a latch coupled to the output of said comparison circuit.

12. The selector of claim 5 wherein said comparison circuit provides a two bit code output for selecting between three frequency rates.

13. The selector of claim 5 wherein said comparison circuit compares said output of said counter to two thresholds corresponding to two frequencies.

14. An automatic frequency rate selector in a telecommunications semiconductor chip, comprising:
a ramp signal generator including
a fixed current source,
a capacitor coupled to said current source, and
a first switch connected in parallel with said capacitor,
a second switch having a smaller current capacity than said first switch, said second switch being connected in parallel with said capacitor, and
an external resistor coupled to said fixed current source;
a comparator for comparing an output of said ramp signal generator to a reference voltage;
a clock input;
a timing circuit for enabling said ramp signal generator in response to a clock signal from said clock input, said timing circuit sequentially activating said first and second switches to minimize voltage spikes;
a counter coupled to said clock input, said counter being initialized by said timing circuit;
a digital comparison circuit for comparing an output of said counter to at least one threshold; and
a mode selector, coupled to an output of said comparison circuit, for selecting a communication mode.

15. A method for automatic mode selection in a semiconductor chip, comprising:
providing a system clock of a particular protocol;
determining a frequency of said system clock, without requiring an additional clock, and providing a detected frequency signal; and
selecting a mode corresponding to said particular protocol responsive to said detected frequency signal.

16. The method of claim 15 wherein said protocol is one of STS-1, T3 and E3.

17. The method of claim 15 wherein said determining a frequency further comprises:
generating a ramp signal;
comparing said ramp signal to a reference voltage;
enabling said ramp signal generating in response to said system clock;
initializing a counter; and
comparing an output of said counter to at least one threshold.

* * * * *